US007171847B2

(12) United States Patent
Kuhn

(10) Patent No.: US 7,171,847 B2
(45) Date of Patent: Feb. 6, 2007

(54) METHOD AND DEVICE FOR MEASURING THE INJECTION RATE OF AN INJECTION VALVE FOR LIQUIDS

(75) Inventor: Ulrich Kuhn, Renningen (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/532,504

(22) PCT Filed: Jun. 4, 2003

(86) PCT No.: PCT/DE03/01852

§ 371 (c)(1),
(2), (4) Date: Nov. 16, 2005

(87) PCT Pub. No.: WO2004/040129

PCT Pub. Date: May 13, 2004

(65) Prior Publication Data

US 2006/0156801 A1 Jul. 20, 2006

(30) Foreign Application Priority Data

Oct. 25, 2002 (DE) ................................ 102 49 754

(51) Int. Cl.
*G01M 15/00* (2006.01)

(52) U.S. Cl. .................................................... 73/119 A

(58) Field of Classification Search .................. 73/112, 73/113, 114, 116, 117.2, 117.3, 118.1, 119 R, 73/119 A See application file for complete search history.

(56) References Cited

U.S. PATENT DOCUMENTS 4,426,981 A 1/1984 Greiner et al.
4,856,321 A * 8/1989 Smalling et al. ......... 73/40.5 A
5,753,806 A * 5/1998 Ryan et al. ............... 73/119 A
6,484,573 B2 * 11/2002 Bundock et al. .......... 73/119 A
6,532,809 B2 * 3/2003 Robinson .................. 73/119 A
7,000,450 B2 * 2/2006 Unger et al. ................. 73/1.36
7,080,550 B1 * 7/2006 Goris et al. ............... 73/119 A
2003/0177817 A1 9/2003 Unger et al.
2005/0034514 A1 * 2/2005 Shen ........................ 73/119 A

FOREIGN PATENT DOCUMENTS

DE 31 18 425 A1 12/1982
DE 39 16 418 A1 11/1990
WO WO 02/064970 A1 8/2002

* cited by examiner

*Primary Examiner*—Eric S. McCall
(74) *Attorney, Agent, or Firm*—Ronald E. Greigg

(57) ABSTRACT

A method for measuring the injection rate of an injection valve for liquids, preferably for liquid fuel, in which the injection valve injects the liquid into a liquid-filled measurement volume, the measurement volume being closed off on all sides and a pressure sensor being located in the measurement volume. From the measured pressure values or by a separate measurement, the speed of sound is determined and thus the injection quantity or the course over time of the injection rate is calculated. The apparatus includes a measurement volume, an injection valve, which protrudes with at least one injection opening into the measurement volume, and a pressure sensor, which is located in the pressure node of the first natural pressure oscillation of the measurement volume.

14 Claims, 2 Drawing Sheets

METHOD AND DEVICE FOR MEASURING THE INJECTION RATE OF AN INJECTION VALVE FOR LIQUIDS

CROSS-REFERENCE TO RELATED APPLICATIONS

This application is a 35 USC 371 application of PCT/DE 03/01852 filed on Jun. 4, 2003.

BACKGROUND OF THE INVENTION

1. Field of the Invention

This invention relates to an improved method of and apparatus for measuring the injection rate of an injection valve, and more particularly to the injection rate of a fuel injection valve.

2. Description of the Prior Art

In the production and function testing of fuel injection components, such as injection valves, common rail injectors, and other high-pressure injection valves, various testing devices and methods for measuring quantity are described in the prior art. For instance, from German Patent Disclosure DE 100 64 511 A1, the measurement piston principle is known, in which the injection valve injects fuel into a measurement volume filled with a test medium. The pressure in the measurement volume is kept constant by providing that a measurement piston is positively displaced by the injection quantity. From the displacement of the measurement piston, the injection quantity can then be calculated directly. Because of the mechanical piston motion, this method is dynamically limited, and as a result it cannot meet the increasingly stringent demands for chronologically high-resolution measurement of the injection rate in modern high-pressure injection systems for internal combustion engines, which often include a plurality of partial injections per injection cycle.

An alternative and precise method, as described for instance in W. Zeuch, "*Neue Verfahren zur Messung des Einspritzgesetzes und der Einspritz-Regelmäβigkeit von Diesel-Einspritzpumpen", Motortechnische Zeitschrift* (*MTZ*) ["New Methods for Measuring the Injection Principle and the Regularity of Injection of Diesel Injection Pumps", Automotive Engineering Journal] 22 (1961), pp. 344–349, is the hydraulic pressure increase method (HDV). In it, the injection valve likewise injects into a liquid-filled measurement volume, but here it is the measurement volume that is kept constant. As a result, a pressure increase occurs in the measurement volume and is measured by a suitable pressure sensor. Modern piezoelectrically-based pressure sensors are distinguished by a very fast response time, which makes chronologically high-resolution measurements possible. From the course over time of the pressure increase, both the course of the injection rate and the injection quantity can in principle be calculated.

In practice, however, this is made more difficult by a number of factors: In the measurement volume V, the injected fuel causes pressure oscillations in the corresponding natural frequencies of the measurement volume, and these natural frequencies depend on the geometric dimensions of the measurement volume. Besides the fundamental oscillation, as a rule many harmonics are also induced, and as a rule a plurality of oscillation modes are possible. This makes filtering of the pressure sensor measurement signal more difficult, since the frequencies of the natural oscillations are partly in the range of the frequencies of the measurement signal.

Precise measurement of the absolute value of the injection quantity Δm is also made more difficult by the fact that the measured magnitude of the pressure must first be converted to the injected liquid quantity. The conversion factors include the modulus of compression and the density. These variables depend on the test conditions and the prior history in question and are therefore not available from earlier measurements with the requisite precision. To ascertain these variables, a separate, complicated calibration operation is necessary for each measurement, which makes the measurement inconvenient and in practice hard to perform. To that end, via a separate calibration cylinder, a defined calibration volume $\Delta V_k$ is introduced into the measurement volume V, and the pressure change $\Delta p_k$ is measured. The modulus of compression K is then obtained from the equation $$K=\Delta p_k/\Delta V_k \cdot V \qquad \text{(I)}$$

The injected volume ΔV can thus be calculated as follows:

$$\Delta V=V/K \cdot \Delta p$$

In order finally to calculate the injection quantity, a conversion to mass is necessary, which requires knowledge of the density ρ:

$$\Delta m=\rho \cdot \Delta V=V \cdot \rho/K \cdot \Delta p$$

The density depends on the temperature of the test medium. To take this into account, the temperature is measured by means of a temperature sensor in the measurement volume, and the density is corrected accordingly. The temperature measurement is pointwise and does not take any possibly unequal temperature in the entire measurement volume into account.

For ascertaining the modulus of compression K by the above equation (I), it is necessary to introduce a defined calibration volume into the measurement volume, which makes a separate volume transducer necessary. Furthermore, there is the disadvantage that for the calibration measurement, a separate measurement time is necessary, which lessens the possible frequency of successive measurements.

SUMMARY AND ADVANTAGES OF THE INVENTION

The method according to the invention has the advantage over the prior art that from the pressure course the injection quantity can be determined in a simple way. To that end, the course over time of the pressure in the measurement volume is recorded upon injection, and the course over time of the injection quantity is calculated from that. To ascertain the factor for calculating the absolute value of the injection quantity, the speed of sound is determined. From the pressure increase and the speed of sound, the injection quantity, or its course over time, that is, the quantity injection rate, can then be calculated directly.

In an advantageous refinement of the method, the speed of sound is ascertained by means of a separate measurement operation, in which a sound pulse is output into the measurement volume by a sound transducer and is intercepted by the pressure sensor. If the sound transducer and the pressure sensor are located diametrically opposite one another, then the speed of sound can be calculated directly from the spacing and the transit time. This is a very fast measurement method, which causes hardly any significant delays in measurement.

In another advantageous refinement of the method, the measurement data of the pressure course are stored in memory with the aid of an electronic computer, which also makes direct further processing of the data possible.

In a further advantageous refinement of the measurement method, the frequency of a natural pressure oscillation of the measurement volume is determined from the measured pressure values. From the natural frequency, the speed of sound is then obtained as an averaged variable over the entire measurement volume, without requiring a separate measurement with corresponding devices. For instance, it is possible here to calculate the frequency analysis with the aid of a Fourier method, but other, modern methods are also possible.

The filtering of the measured pressure values is done for instance with a low-pass filter, so that interference and noise are largely eliminated. From the chronological differentiation of the pressure signal, the injection quantity rate can then be determined.

The apparatus of the invention has the advantage over the prior art that the measurement signal can be better filtered. To that end, the pressure sensor is located in the pressure node of the first natural pressure oscillation, that is, the fundamental natural oscillation, so that the pressure sensor does not detect any signal from the fundamental natural oscillation. The limit frequency of the low-pass filter can therefore be shifted upward by a factor of two for smoothing out the measured pressure values.

BRIEF DESCRIPTION OF THE DRAWINGS

One exemplary embodiment of the invention is described herein below, with reference to the drawings, in which.

DESCRIPTION OF THE PREFERRED EMBODIMENT

Figure 1:
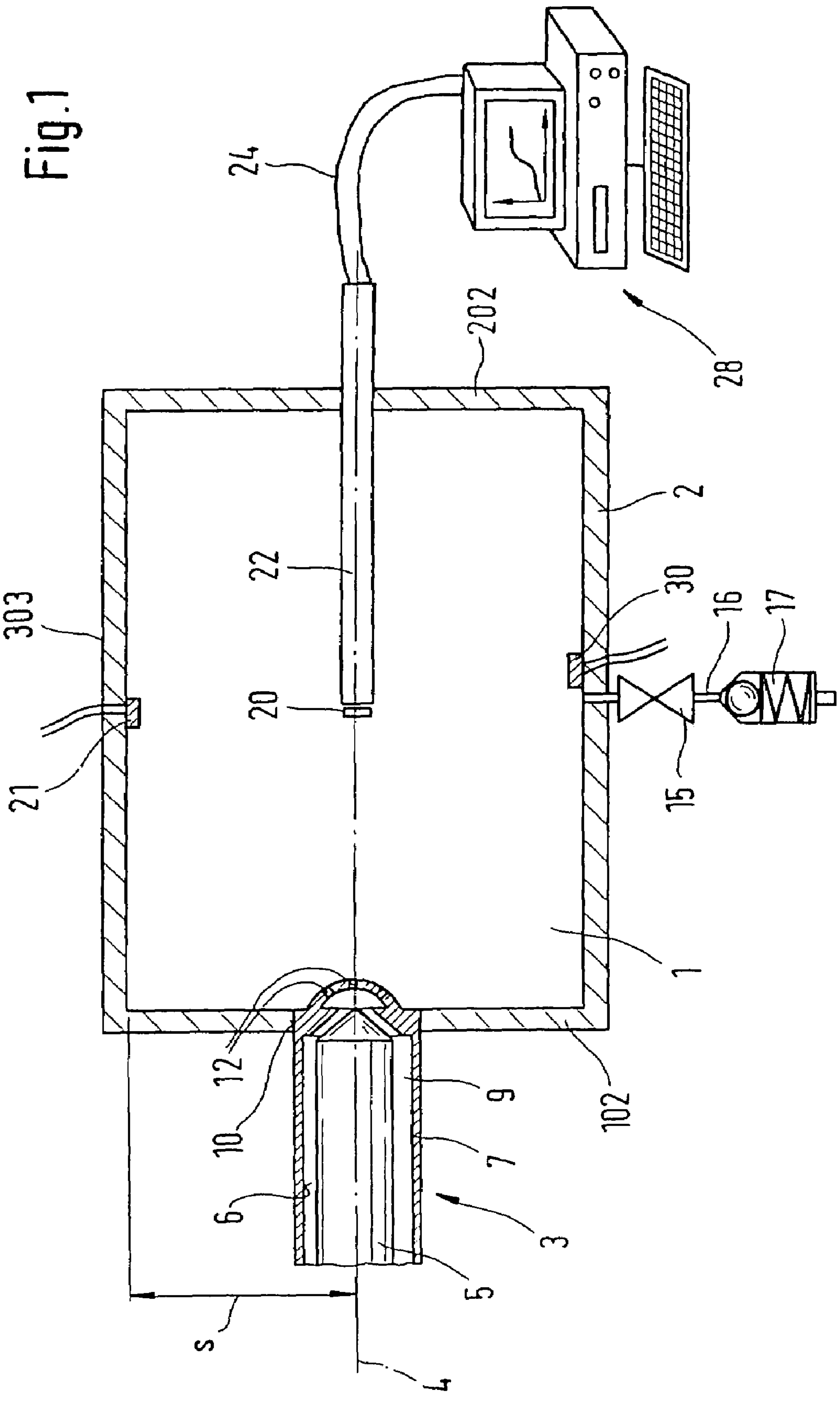
FIG. 1 is a schematic illustration of the measurement apparatus of the invention.

In FIG. 1, the measurement apparatus is shown in a partly sectional view. A cylindrical measurement volume 1 with a wall 2 is completely filled with a test liquid, and the measurement volume 1 is closed off on all sides. The wall 2 has a first base 102 and a second base 202, which are joined by the cylindrical sidewall 303, which has a longitudinal axis 4. An injection valve 3 protrudes with its tip through an opening 10 in the first base 102 of the wall 2 into the measurement volume 1; the passage of the injection valve 3 through the wall 2 is closed off in liquid-tight fashion. The injection valve 3 has a valve body 7, in which a pistonlike valve needle 5 is longitudinally displaceable in a bore 6. By means of a longitudinal motion of the valve needle 5, a plurality of injection openings 12, which are embodied at the tip, protruding into the measurement volume 1, of the injection valve 3, are opened or closed. When the injection openings 12 are open, test liquid flows out of a pressure chamber 9, embodied between the valve needle 5 and the wall of the bore 6, to the injection openings 12, and from there is injected into the measurement volume 1, until the injection openings 12 are closed again by the valve needle 5. The injection of the test liquid is done at a high pressure, which depending on the injection valve used can be as high as 200 Mpa.

A line 16 communicating with a pressure holding valve 17 discharges into the side wall 303 of the cylindrical wall 2, and through it test liquid can be diverted out of the measurement volume 1 into a leakage volume, not shown in the drawing. Also located in the line 16 is a control valve 15, by which the line 16 can be closed as needed, if there is no need for diverting test liquid out of the measurement volume 1. The pressure holding valve 17 assures that a certain pressure in the measurement volume 1 will be maintained and that the measurement volume will always remain completely filled with liquid.

A mount 22 protrudes through the second base 202 of the wall 2 into the measurement volume 1. On the end of the mount 22 is a pressure sensor 20, which communicates via a signal line 24, which leads out of the measurement volume 1 in the mount 22, with an electronic computer 28; the passage of the mount 22 through the wall 2 is closed in liquid-tight fashion. The pressure sensor 20 is located in the center plane between the two bases 102, 202 of the wall 2 and thus has the same spacing from both of the bases 102, 202. Since the pressure sensor 20 is also located on the longitudinal axis 4, it has the same spacing s on all sides from the sidewall 303. Via the electronic computer 28, the signal that the pressure sensor 20 furnishes can be read out and electronically stored in memory. To make a fast measurement of the pressure course possible, the pressure sensor 20 is constructed on a piezoelectric basis, for instance, so that even rapid changes in the pressure can be measured without significant delay. A sound transducer 21, which has the spacing s from the pressure sensor 20 is located on the sidewall 303 of the wall 2. Alternatively, it may be provided that a separate sound receiver 30 is located diametrically opposite the sound transducer 21 on the sidewall 303, so as to obtain the longest possible travel path of the sound signal and thus greater precision in determining the speed of sound c.

The injection quantity $\Delta m$ to be measured of the test liquid can be calculated from the pressure increase and the speed of sound. If $\rho$ is the density of the test liquid and V is the volume of the measurement volume, then the injection of the injection valve at a constant volume V causes a change in the density $\Delta\rho$, so that the applicable equation is $$\Delta m = V \cdot \Delta\rho$$

By the familiar acoustic theory, the relationship between the speed of sound c, the change in density $\Delta\rho$ and the pressure increase $\Delta p$ is as follows $$\Delta\rho = \Delta p \cdot 1/c^2$$

and thus the following equation applies $$\Delta m = V \cdot 1/c^2 \cdot \Delta p = V \cdot \rho/K \cdot \Delta p \quad \text{(II)}$$

There is accordingly a direct relationship between the pressure increase $\Delta p$ and the change in quantity $\Delta m$.

With the pressure sensor 20, the course over time of the pressure is measured, from which in turn the injection rate r(t) can be determined, that is, the quantity dm(t) of the test liquid injected per unit of time dt. From the above relationship, the following equation thus results for the injection rate r(t), that is, the chronological derivation of the injected quantity dm(t)/dt:

$$r(t) = dm(t)/dt = V/c^2 \cdot dp(t)/dt \quad \text{(III)}$$

That is, with knowledge of the speed of sound c and the volume V, the absolute value of the injection rate r(t) can be calculated from the course over time of the pressure p(t).

Upon injection of the test liquid into the measurement volume 1, which initially has a constant pressure that is for instance 1 MPa, the pressure in the measurement volume 1 increases. In comparison to gases, liquids are practically incompressible so that even a slight increase in quantity leads to a readily measurable pressure increase. By the sudden introduction of the test liquid, natural pressure oscillations are induced in the measurement volume 1. The natural frequencies depend on the geometric dimensions of the measurement volume 1: For the first natural pressure oscillation, or so-called fundamental oscillation, in which a longitudinal wave oscillates along the longitudinal axis 4, half the wavelength $\lambda/2$ is equal to half the length L of the measurement volume 1; that is, $$\lambda=\lambda_e=2\cdot L.$$

Figure 2:
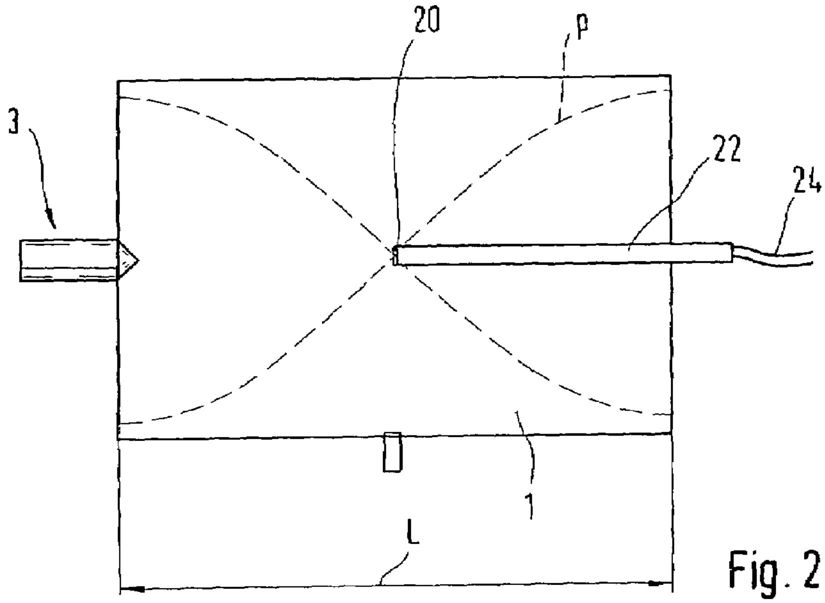
FIG. 2 is a representation of the measurement volume with the course of pressure of the first natural pressure oscillation.

FIG. 2 schematically illustrates this first natural pressure oscillation; the lines marked p indicate the pressure course, with pressure bulges at the edges, and a pressure node is located in the middle, that is, in the radial plane of the cylindrical measurement volume in which the pressure sensor 20 is located. The frequency $\nu_e$ of the first natural pressure oscillation is then calculated simply, from the speed of sound c using the equation $\lambda_e\cdot\nu_e=c$, as $$\nu_e=c/\lambda_e=c/(2\cdot L)$$

For the frequency $\nu_n$ of the $n^{th}$ harmonic, it is accordingly true that the length L of the measurement volume must be a multiple of $\lambda/2$:

$$\nu_n=(n\cdot c)/(2\cdot L)$$

The pressure sensor 20 does not record the first natural pressure oscillation, since no pressure changes occur at the pressure node. Nor are the second, fourth, and all the other even-numbered harmonics recorded by the pressure sensor 20.

For assessing the measurement, the procedure is as follows: The injection valve 3, as a result of a rapid longitudinal motion of the valve needle 5, by which the injection openings 12 are opened and closed again, injects a certain quantity of liquid into the measurement volume 1, in which a test liquid is located. The pressure sensor 20 measures the pressure p(t), which is read out by the computer 28 at a certain rate, for instance 100 kHz, and stored in memory.

To determine the course over time of the injection quantity dm(t)/dt, that is, the injection rate r(t), equation (III) is used. The measured values p(t) stored in the computer are chronologically differentiated and multiplied by the factor $V/c^2$, which directly yields the injection rate r(t).

Besides determining the speed of sound using a separate measurement, it is also possible to determine it directly from the measured pressure values. The measured pressure values recorded in the computer 28 are on the one hand mixed with noise, on the other, natural pressure oscillations of the measurement volume 1 are superimposed on them, causing further adulterations. From a frequency analysis, the frequencies of the first harmonic of the natural pressure oscillations can be determined from the measured pressure values, and from that, in accordance with the equation given above, $c=\nu\cdot L$, the speed of sound c that prevails in the test liquid used at the prevailing conditions is calculated. Although the approximate magnitude of c is naturally known, there are nevertheless fluctuations caused by changes of composition of the test liquid or changes of temperature, which would otherwise cause a loss of measurement precision. High-frequency noise can be suppressed by low-pass filtration of the measured pressure values. Because the pressure sensor 20 is located in the middle of the measurement volume, the limit frequency $\nu_G$ for the low-pass filter can be selected to be twice as high, since the first fundamental oscillation is not recorded by the pressure sensor 20. The smoothed measured pressure values are then chronologically differentiated, and after multiplication by the factor $V/c^2$, this yields the injection rate r(t) for a known volume V.

The speed of sound c can also be determined in a separate method. To that end, a sound pulse is emitted by the sound transducer 21 and is intercepted, after a transit time $t_L$, by the pressure sensor 20, acting as a sound receiver, or by a separate sound receiver 30. From the spacing s of the sound transducer 21 and the pressure sensor 20, the speed of sound c is then calculated in accordance with the equation $$c=s/t_L.$$

From the equation (II) given above, the injected quantity Δm is thus obtained immediately.

Figure 3:
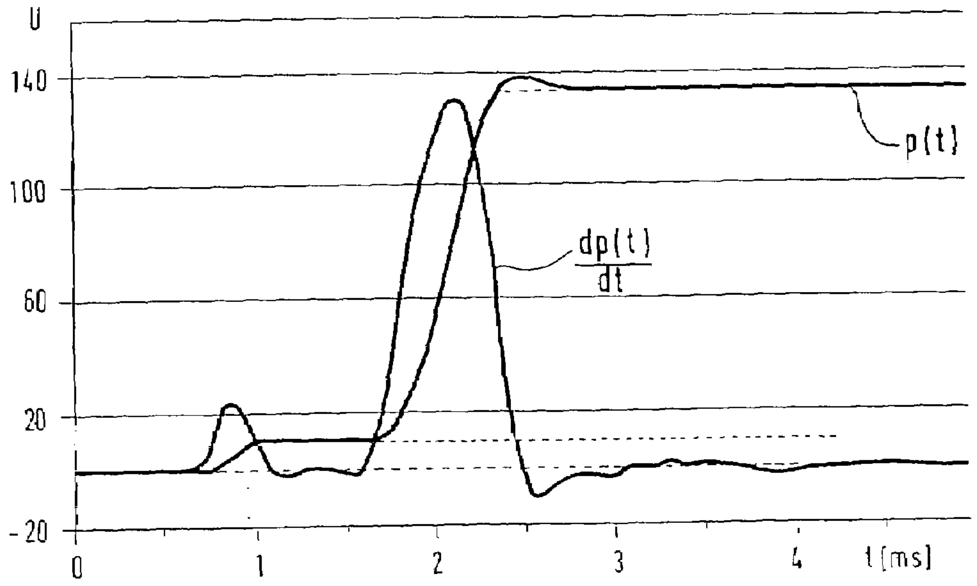
FIG. 3, the graph of a measurement, with the pressure and its derivation over time plotted.

FIG. 3 shows the course over time of the pressure p(t) and its derivation dp(t)/dt as a function of the time t in arbitrary units U. The pressure p(t) increases to a first level approximately at time t=1 ms and to a second, markedly higher level approximately at time t=2 ms. This is equivalent to an injection of a lesser quantity of test liquid first and after an interval of approximately 1 ms a larger quantity. If an injection valve of the kind used for direct-injecting self-igniting internal combustion engines is measured, this is equivalent to a fuel injection that is broken down into a pilot injection or preinjection and a subsequent main injection. Once the pressure signal p(t) measured by the pressure sensor 20 has been smoothed by the method described above, the derivation dp(t)/dt yields a value which is proportional to the injection rate r(t). By multiplication by the factor $V/c^2$, finally, the absolute value of the injection rate r(t) is obtained from this.

The measurement method together with the described measurement setup thus makes it possible to measure the pressure course and to determine the speed of sound c under current test conditions, from which the injection quantity and the injection rate can then be determined. If the speed of sound c is calculated from the frequency of the natural oscillations, then all the necessary variables can be determined from the pressure course, which precludes errors caused by additional components. Because the pressure sensor 20 is located precisely between the two bases 102, 202, the limit frequency $\nu_G$ of the low-pass filter can be increased to twice the frequency of the fundamental oscillation $\nu_e$, without the expectation of any impairment in quality from the filtering. Complicated calibration methods, in which the speed of sound is determined in a separate measurement method, can thus be dispensed with.

The test liquid may be fuel or some other liquid whose properties are close to those of the substance that is used in normal use of the injection valve. The measurement volume 1 need not be cylindrical; instead of a cylinder, a block-shaped measurement volume 1 or some other suitable shape may be provided, such as a sphere. In this case as well, the pressure sensor 20 is located in a pressure node of the first natural pressure oscillation of the measurement volume 1, so that the limit frequency for the filtration can be set as high as possible.

The foregoing relates to preferred exemplary embodiments of the invention, it being understood that other variants and embodiments thereof are possible within the spirit and scope of the invention, the latter being defined by the appended claims.

The invention claimed is:

1. A method for measuring the injection rate of an injection valve for liquids, preferably for liquid fuel, in which the injection valve (3) injects the liquid into a liquid-filled measurement volume (1), the measurement volume (1) being closed off on all sides and a pressure sensor (20) being located in the measurement volume (1), the method comprising the steps of:

injecting liquid by the injection valve (3) into the measurement volume (1);

measuring the pressure (p(t)) in the measurement volume (1) by means of the pressure sensor (20) during the injection, and recording of these measured values;

determining the speed of sound (c) in the measurement volume (1); and determining the injected test liquid quantity (m(t); Δm) from the measured pressure values (p(t)) and the speed of sound (c).

2. The method according to claim 1, wherein the measured pressure values (p(t)) are recorded by an electronic computer (28) during the injection.

3. The method according to claim 1, wherein the speed of sound (c) is determined by means of a separate measurement method.

4. The method according to claim 3, wherein the speed of sound is calculated from the transit time of a sound signal traveling from a sound transducer (21) to a sound receiver (20; 30).

5. The method according to claim 1, wherein the speed of sound (c) is determined from the natural frequencies ($v_n$) of the measurement volume (1).

6. The method according to claim 5, wherein the natural frequencies ($v_n$) are determined by a frequency analysis of the measured pressure values (p(t)).

7. The method according to claim 6, wherein the measured pressure values (p(t)) are filtered with a low-pass filter.

8. The method according to claim 7, wherein from the course of the measured pressure values (p(t)), a variable proportional to the injection rate (r(t)) is calculated by chronological differentiation.

9. An apparatus for measuring the injection rate (r(t)) of an injection valve (3) for liquids, the apparatus comprising a measurement volume (1) which is closed off by walls on all sides and is filled with a test liquid, an opening (10) in the wall (2) of the measurement volume (1) for receiving an injection valve (3), so that the injection valve (3) in the installed position protrudes with at least one injection opening (12) into the measurement volume (1), and a pressure sensor (20) which is located in the measurement volume (1), the pressure sensor (20) being disposed in the pressure node of the first natural pressure oscillation of the measurement volume (1).

10. The apparatus according to claim 9, wherein the measurement volume (1) is embodied cylindrically.

11. The apparatus according to claim 10, wherein the pressure sensor (20) is located in the radial plane that is located centrally between the two bases (102; 202) of the cylinder.

12. The apparatus according to claim 9, further comprising an electronic computer (28) which detects the measured values of the pressure sensor (20) and stores them in memory.

13. The apparatus according to claim 12, further comprising a program that calculates the natural frequencies of the measurement volume (V) from the recorded measured pressure values (p(t)) runs on the electronic computer (28).

14. The apparatus according to claim 9, further comprising a sound transducer (21) and a separate sound receiver (30) are located in the measurement volume (V).

* * * * *